Oct. 10, 1961    K. SCHIELE    3,003,387
FOCUSING SCREEN FOR CAMERA FINDERS
Filed July 8, 1958    5 Sheets-Sheet 1

Oct. 10, 1961 K. SCHIELE 3,003,387
FOCUSING SCREEN FOR CAMERA FINDERS
Filed July 8, 1958 5 Sheets-Sheet 3

Oct. 10, 1961  K. SCHIELE  3,003,387
FOCUSING SCREEN FOR CAMERA FINDERS
Filed July 8, 1958  5 Sheets-Sheet 4

Oct. 10, 1961 K. SCHIELE 3,003,387
FOCUSING SCREEN FOR CAMERA FINDERS
Filed July 8, 1958 5 Sheets-Sheet 5 reflex finder

United States Patent Office 3,003,387
Patented Oct. 10, 1961

3,003,387
FOCUSING SCREEN FOR CAMERA FINDERS
Karl Schiele, Braunschweig, Germany, assignor to Franke & Heidecke, Fabrik Photographischer Prazisions-Apparate, Braunschweig, Germany, a German firm
Filed July 8, 1958, Ser. No. 747,194
Claims priority, application Germany July 11, 1957
8 Claims. (Cl. 88—1)

This invention relates to a focusing screen for camera finders, especially for reflex cameras.

An object of the invention is the provision of a generally improved and more satisfactory focusing screen.

Another object is the provision of a focusing screen structure for increasing the apparent brightness of the image as seen on the focusing screen by the observer, in a simple and inexpensive manner.

Still another object is the provision of a focusing screen so designed and constructed as to enable sharp and accurate focusing of the image, and at the same time serving to deflect the rays of light from the objective toward the locus of the eye of the observer, to increase the apparent brightness of the image.

The following description presupposes that the reader is familiar with the general requirements and general optical principles involved in screens for focusing viewfinders of reflex cameras or the like, as outlined for example in U.S. Patent 1,572,236, dated February 9, 1926, to Frederick, and in U.S. Patent 2,589,014, dated March 11, 1952, to McLeod, and in German Patent 753,376, published February 9, 1953, to Zeiss Ikon A.G. The principles and requirements set forth in those patents need not be repeated here.

The above-mentioned McLeod patent emphasizes (column 2, lines 5–13) that in order to achieve the desired results, it is necessary to use two separate optical elements, one being a Fresnel lens surface and the other being a conical surface. According to the present invention it has been discovered, however, that if a conical or pyramidal surface is formed in a particular way, with cones or pyramids having apex angles and axes in a particular arrangement, the surface having the conical or pyramidal pattern itself can be made to perform the functions for which it was previously thought necessary to have a separate Fresnel lens surface. It is, accordingly, a further object of the present invention to provide a focusing screen one surface of which may be plane and smooth, and only one surface of which is non-plane or non-smooth, this latter surface containing a multitude of asymmetrical cones having increasing asymmetry at increasing distances from the optical axis, or a multitude of pyramids each of which has its axis (from apex to mid-point of base) inclined or tilted at an acute angle relative to the general plane of the focusing screen, or which is otherwise arranged in an asymmetrical manner.

These and other desirable objects may be attained in the manner disclosed as an illustrative embodiment of the invention in the following description and in the accompanying drawings forming a part hereof, in which:

FIGS. 1, 2, and 3 are optical diagrams illustrating the fundamental principle of the invention;

FIG. 4 is a diagrammatic axial section taken through an objective and part of an associated focusing screen (showing the latter on a greatly enlarged scale) illustrating one form of pyramidal surface and also showing various positions of a forming tool which may be used to form the pyramidal surface;

FIGS. 5, 6, 7, and 8 are diagrammatic perspective views showing various forms of individual conical or pyramidal elements according to the present invention;

The same reference numerals throughout the several views indicate the same parts.

Figure 1:
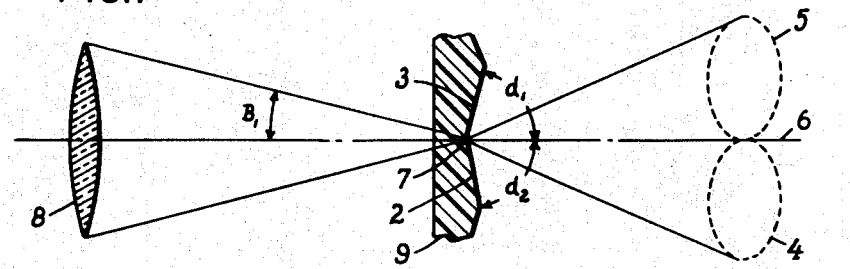

Referring now to the drawings, an objective is shown at 8, which objective forms an image of the object on the screen 9. The objective is movable toward and away from the screen for focusing purposes, by conventional mechanisms well known in the art. For purposes of the present invention, it is wholly immaterial whether the objective projects the image directly onto the focusing screen, in the manner shown for example in FIG. 1 of the drawings of said McLeod patent and FIGS. 1–4 and 10 of the present application, or whether the rays of light passing from the objective to the focusing screen are reflected by a mirror, as shown for example in FIG. 2 of the drawings of said McLeod patent and FIG. 11 of the drawings of the present application and as customary in reflex cameras. Moreover, it is wholly immaterial for purposes of the present invention whether the objective 8 serves both as a photographic objective and as a focusing objective, as usual in so-called single lens reflex cameras, or whether it constitutes merely a finder objective and is used in conjunction with a separate photographic objective, as is customary in so-called twin lens reflex cameras, such as the "Rolleiflex" and "Rolleicord" cameras manufactured by the firm of Franke & Heidecke, of Braunschweig, Germany, and widely known and used in the United States and elsewhere. Whatever the arrangement, whether it be non-reflex, single lens reflex, or twin lens reflex, the focusing screen of the present invention in any event operates in the same way.

According to the present invention, one face of the focusing screen or focusing grid plate may be smooth, while the other face is provided with a multiplicity of very small conical or pyramidal elements, this last mentioned face being the one on which the image is focused. In the diagrams constituting FIGS. 1–3, opposite faces of the cones or pyramids are indicated diagrammatically at 2 and 3, and they meet at an apex 7. With correct focusing, the image point is exactly in the transverse plane of the apex 7. The component image is then not split up. If the image point moves out of this correctly focused position (i.e., out of the position in the transverse plane of the apex 7) then the conical or pyramidal surfaces 2, 3 cause the splitting up of the light forming the image, according to known optical principles, so that the image on the screen appears blurred.

As regards the light energy distribution, the surfaces 2, 3 cause the light to be split up into a number of conical beams which have the same apex angles as the conical beam between the objective 8 and the surfaces 2, 3. If the surfaces 2, 3 are conical, they cause the light to be split up into an infinitely large number of conical beams 4, 5 which surround the axis 6. By this means, the light distribution is limited to this total conical beam formed by the infinitely large number of conical beams. If the surfaces 2, 3 are pyramidal faces instead of conical, the light is not split up into an infinitely large number of conical beams 4, 5, but only into a number of conical beams corresponding to the number of pyramidal surfaces.

Figure 2:
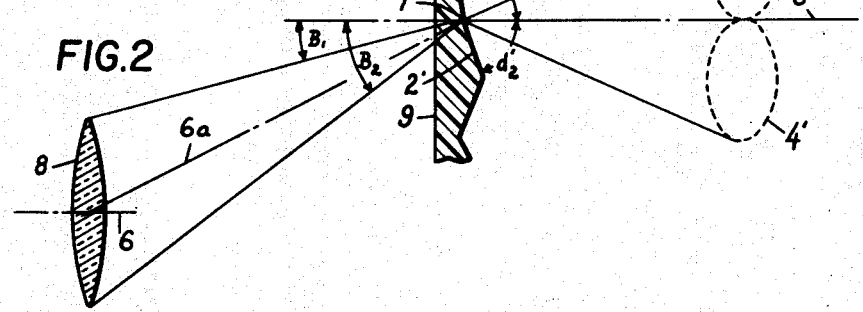

FIG. 1 illustrates the beam splitting action when the apex 7 of the conical or pyramidal element is located on the optical axis 6 of the objective 8. FIG. 2 illustrates the situation when the apex 7 is offset laterally to one side of the optical axis 6 of the objective 8, and it will be noted here that the opposite faces 2′ and 3′ of the conical or pyramidal element, which meet at the apex 7, are sloped non-symmetrically or asymmetrically with respect to the axis 6a extending from the center of the objective 8 to the apex 7 of the particular element in question. The slope or tilt is such (that is, tthe angles $d_1'$ and $d_2'$ are so chosen, with respect to the amount of lateral offset of the apex 7 from the objective axis 6) that the splitting up of the light beam forms a group of conical beams 4′ and 5′ arranged about an axis 6′ which is parallel to the optical axis 6 of the objective 8.

Figure 3:
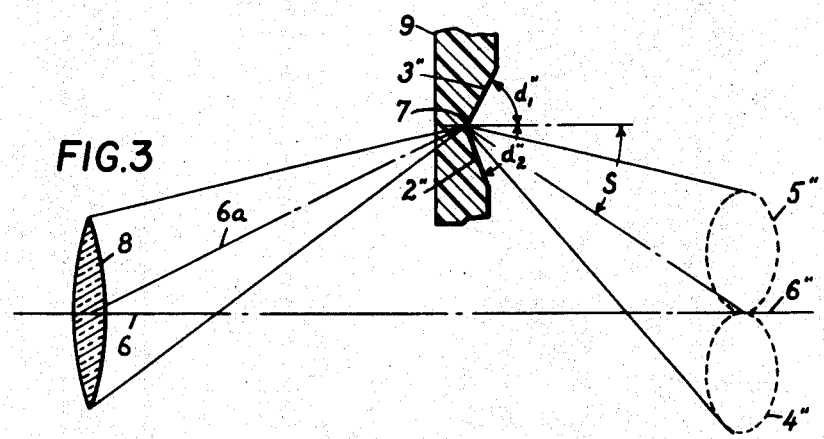

In FIG. 3, the cone is given an even greater inclination or tilt, so that all cones of rays are deflected with the angle S in a direction toward the eye of the observer, assuming that the eye of the observer is located at a suitable point on the axis 6″ corresponding to the optical axis 6 of the objective 8.

Figure 4:
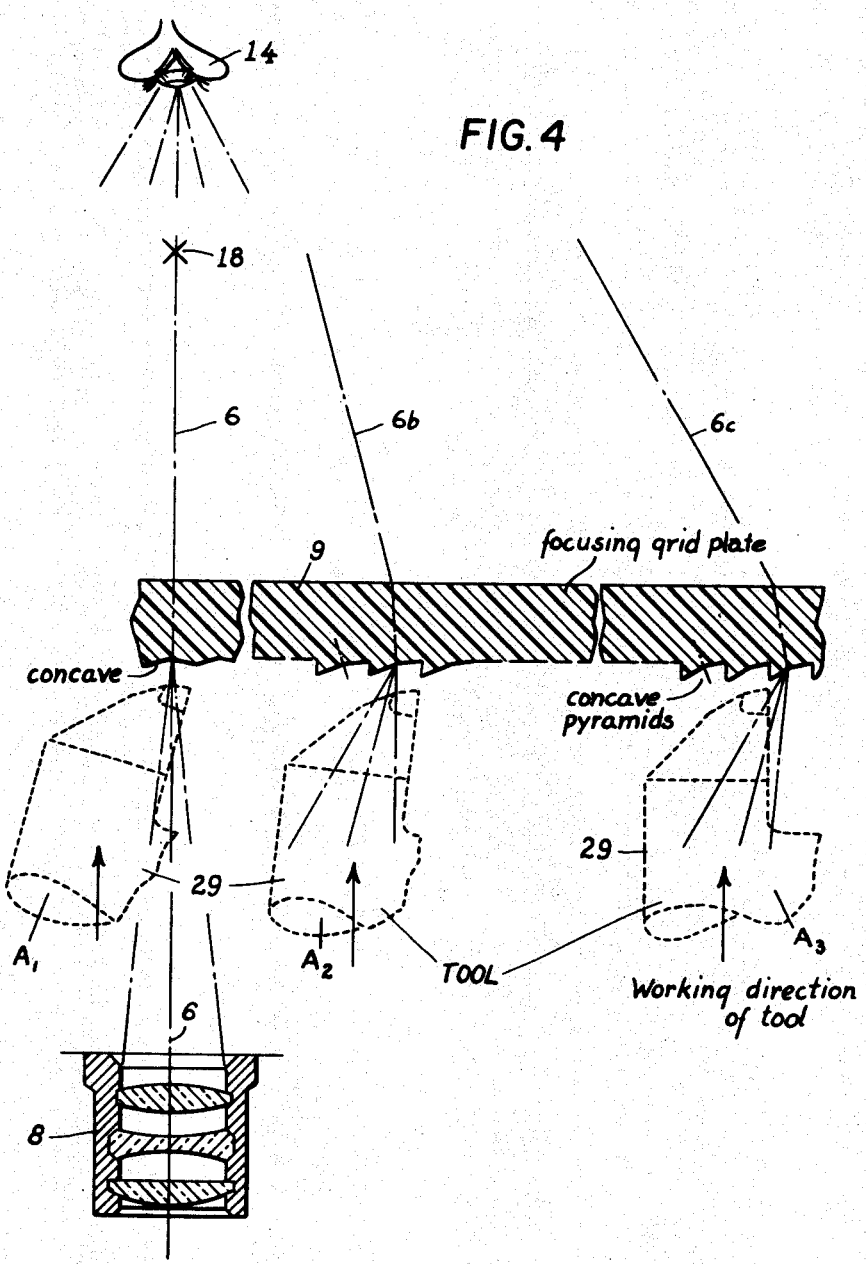

FIG. 4 illustrates somewhat diagrammatically a more complete structure embodying the principles mentioned in connection with FIGS. 1–3. In FIG. 4, the objective 8 projects the focused image on the optical axis 6 to the focusing screen or grid plate 9. Due to the presence of the cones or pyramids, all the light cone axes are deflected toward the eye 14 of the observer, this being accomplished by the fact that the axes of the individual cones or pyramids are tilted or inclined to a progressively greater extent at progressively greater distances laterally from the optical axis 6.

A tool 29 for forming the conical or pyramidal elements in the grid plate or focusing screen is also shown in FIG. 4, in various working positions, further details of such tool 29 being described below in conjunction with FIGS. 12–14. In position $A_1$, when forming a conical or pyramidal element at or approximately at the center of the focusing screen (i.e., on the optical axis) the tool 29 is tilted in such manner that the axis of the pyramidal or conical element will be substantially symmetrical with respect to the optical axis 6. When forming pyramidal or conical elements somewhat offset laterally from the optical axis, in the position $A_2$, the tool 29 is tilted differently so as to tilt the faces or sides of the cone or pyramid to deflect the light beam to a direction converging toward the optical axis 6, as indicated for example by the line 6b, so as to pass toward the eye 14 of the observer. When forming other pyramidal or conical elements further offset laterally from the optical axis and closer to the marginal edges of the focusing screen, the tool is tilted to a different angle as indicated at $A_3$ so as to cause a greater tilt or inclination of the sides of the conical or pyramidal elements relative to the optical axis, deflecting the light beam to a greater extent so that the emergent light passes in the direction 6c, again toward the eye 14 of the observer. In each position of the forming tool, regardless of the tilt or inclination of the tool, the tool is preferably pressed against the surface of the screen in the direction shown by the arrows; that is, in a direction perpendicular to the general plane of the screen.

Figure 5:
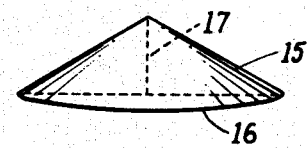

Reference is now made to FIGS. 5–8, showing diagrammatically some of the possible shapes of the individual conical or pyramidal elements. FIG. 5 is intended to illustrate a conical element having a conical surface 15, the base 16 of which may be either circular or elliptical. The axis of the cone is illustrated at 17, and it may be either at right angles (perpendicular) to the plane of the base, or may be inclined thereto. When conical elements are used according to the present invention, the axes 17 of the various cones in various positions on the screen will converge toward a common point 18 located on the optical axis 6, preferably about half way between the screen and the eye of the observer. This convergence of the axes of the various cones does not have to be exact, but convergence approximately toward a common point on the optical axis is sufficient to give superior results as compared with the prior art.

Figure 6:
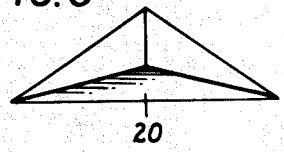

FIG. 6 shows the deflecting surfaces or individual optical elements in the form of a pyramid having a base 20 in the form of an equilateral triangle.

Figure 7:
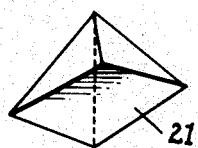

In FIG. 7, the optical element is shown as a four-sided pyramid having a base 21 which is square or rectangular.

Figure 8:
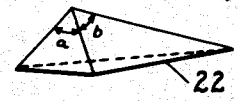

The pyramid shown in FIG. 8 has a base 22 in the form of an isosceles triangle.

Figure 9:
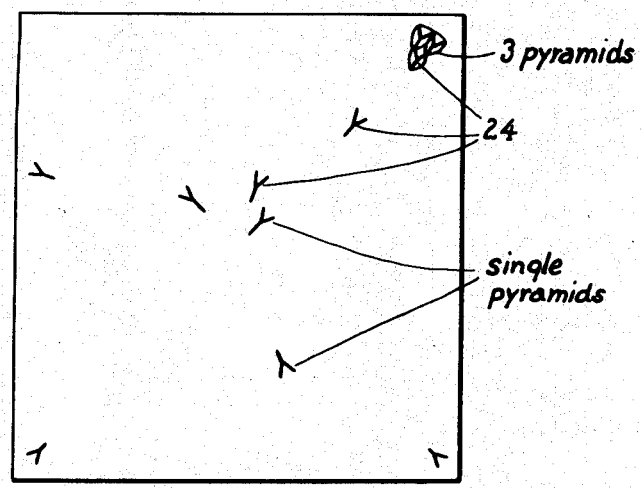
FIG. 9 is a diagram illustrating a preferred arrangement of orientation of pyramids according to the present invention.

By forming the light-deflecting surfaces 2, 3 as cones on an elliptical base surface, or as pyramids with a rectangular base surface or isosceles triangle base surface, it is possible to achieve a preferred splitting of the light in the direction of the longitudinal axes of the base surfaces. This is desirable especially for the marginal elements of the foscusing screen, owing to the different width of the entrance pupil aperture when viewed at an angle to the optical axis of the objective. This is shown in FIG. 9, indicating diagrammatically the face of the screen having pyramids 24 of the kind shown in FIG. 8; that is, pyramids the bases of which are isosceles triangles. These pyramids in FIG. 9 are arranged with their small faces all directed toward the center of the screen 9.

It will be observed that the preferred form of the light-deflecting surfaces 2, 3 on the screen is that of a pyramid having a triangular base, as this gives better light control than cones. Also, pyramids with triangular bases are superior to those formed on bases having more than three sides, because pyramids with more than three faces are likely to be less effective, due to the fact that the edges or corners between any two adjacent faces of the pyramid will unavoidably be slightly rounded in the manufacturing process. If the pyramids have more than three faces, the rounded edges will constitute a larger proportion of the total surfaces present, than if each pyramid has only three faces. This would decrease the efficiency of the screen.

For the same reason, it is desirable that the number of pyramids per unit of area of the screen should not be too large, since the rounded edges may become too large a proportion of the total area, if the pyramids are too small. On the other hand it is desirable that the pyramids should not be too large, as they would then become visible, especially when a magnifying viewfinding lens is used in conjunction with the focusing screen. It is therefore preferred that the distance apart of the apices of adjacent pyramids in all directions should be between $20\mu$ and $40\mu$, or in other words from 0.02 mm. to 0.04 mm.

Figure 10:
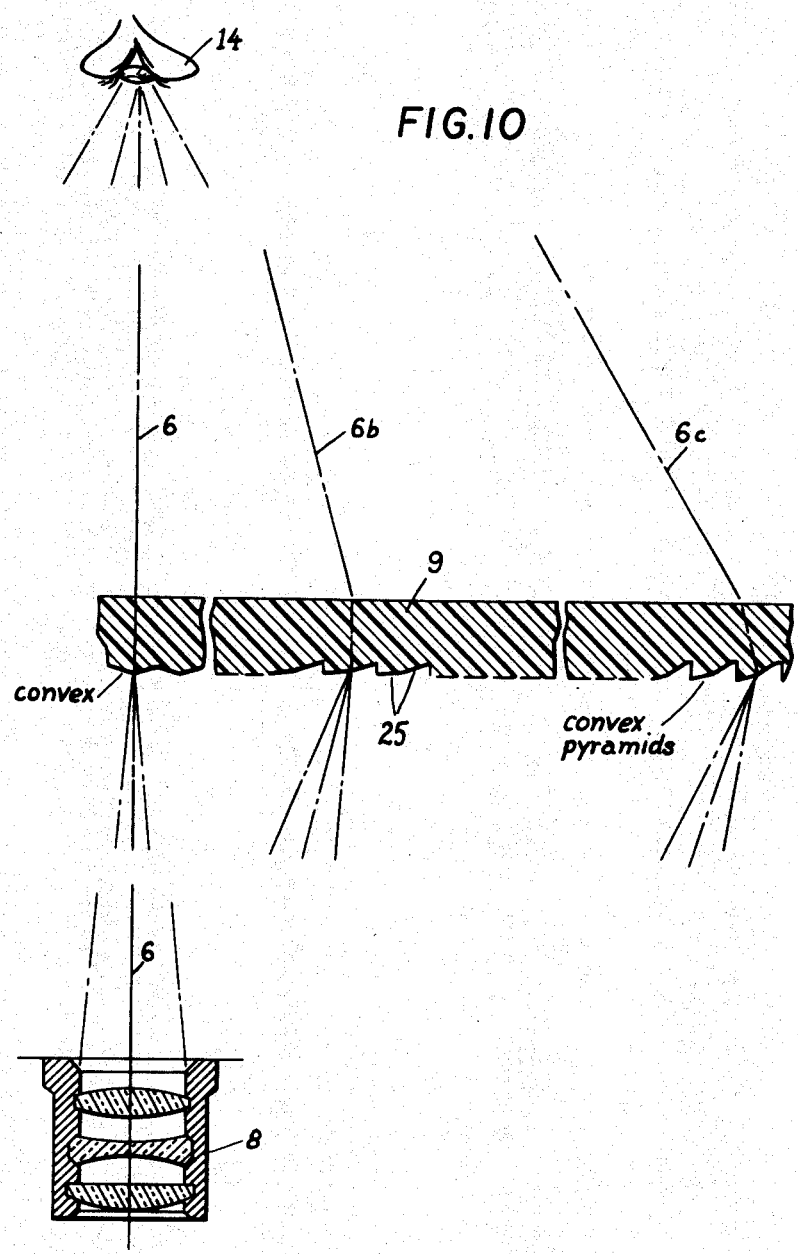
FIG. 10 is a diagrammatic axial section similar to FIG. 4, illustrating a different form of pyramidal surface from that shown in FIG. 4, and omitting the forming tool present in FIG. 4.

The cones or pyramids may be formed either as cavities in the screen (i.e., with the apex of each cone or pyramid pressed into the screen, forming a concave pyramid or cone) as shown in FIG. 4, or as protuberances (i.e., with the apex of each cone or pyramid pointed outwardly from the body of the screen, to form what may be called a convex cone or pyramid) as shown in FIG. 10. Also, the cones or pyramids may be formed on either face of the screen 9, that is, either facing toward the objective and away from the eye of the observer, or facing away from the objective and toward the eye of the observer. The preferred arrangement is the one shown in FIG. 4, employing concave pyramids.

The cavities are preferably made by reciprocating a steel tool against the material of the screen, and by changing the angle of the tool in proportion to the distance of each individual cavity from the center of the screen, as already mentioned in connection with FIG. 4. The cavities may be made in one or more spirals, in straight lines, in wavy lines, or may be arranged in any other desired pattern on the face of the screen, so long as the axes of the cavities are inclined to an increasing extent in proportion to their distance from the center of the screen. Also, the cones or pyramids may be of the same shape over the whole of the screen surface (i.e., made by the same tool, although the inclination or tilt of the tool is varied according to the distance from the center of the screen) or if desired different tools may be used in making the cavities on different portions of the screen, in order that the apex angles (e.g., the angles $a$ and $b$ in FIG. 8) will be different on different pyramids at different locations on the screen.

Figure 11:
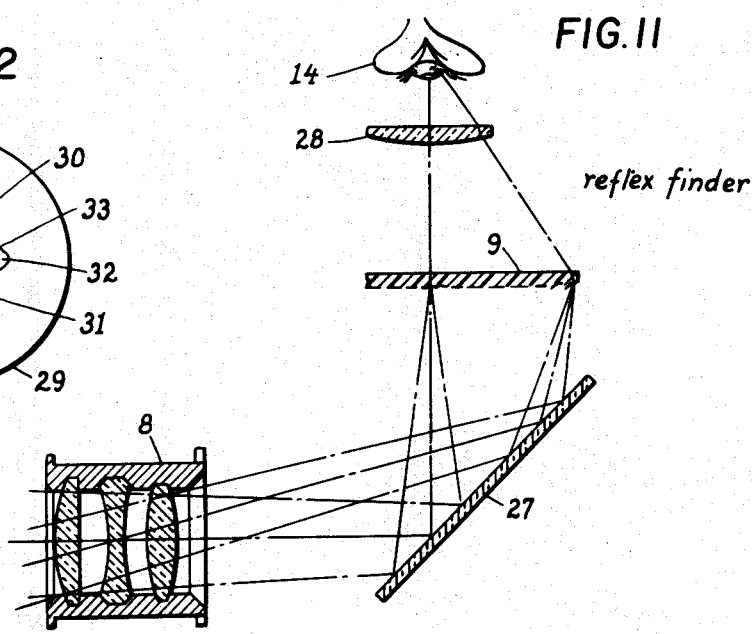
FIG. 11 is a diagrammatic axial section illustrating the invention as applied to a reflex finder.

As already mentioned, it is immaterial whether the focusing screen of the present invention be used in a reflex viewfinder, or in a viewfinder of the non-reflex type. Usually a reflex viewfinder will be employed, as customary in most modern cameras. Such a viewfinder is illustrated in FIG. 11, where the objective 8 throws the image onto a reflector or mirror 27, from which it is reflected onto the screen 9 constructed in accordance with the present invention.

Some cameras have a magnifying lens which may be interposed at will between the focusing screen 9 and the eye 14 of the observer. Such a lens is shown at 28 in FIG. 11. When this lens is used, the observer's eye is spaced at a different distance from the screen, than when viewing it without the lens. Accordingly, the inclination of the axes of the cones or pyramids is arranged, in such a case, to converge the light from the screen toward a point which is a compromise between the two positions of the observer's eye, when viewing the screen with and without the lens.

It would be difficult to make focusing screens according to the present invention from glass. Therefore it is preferred to make them of a sheet of transparent synthetic plastic material sufficiently soft to be able to receive the indentations of the forming tool, and sufficiently hard to retain its shape well after the indentations have been made. A sheet of polystyrol plastic, known also as polystyrene, has been found to be quite satisfactory.

The cones or pyramids are preferably so formed that the apices of all of the pyramids or cones normally lie in the same plane, and the screen as a whole is normally used in a flat condition.

As already explained above, it is not necessary to use a field lens or a Fresnel lens in conjunction with the screen, because the screen of the present invention performs the function of converging the light toward the eye of the observer, as well as the function of indicating the out-of-focus condition. However, a field lens or Fresnel lens can be added if required for special purposes, as for example when an unusually powerful magnifying lens is needed.

Figure 12:
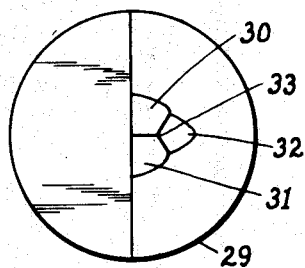
FIG. 12 is an end view of a forming tool for forming pyramids according to the present invention.
Figure 13:
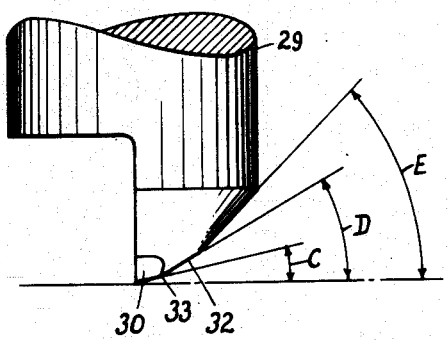
FIG. 13 is a side elevation of the same.
Figure 14:
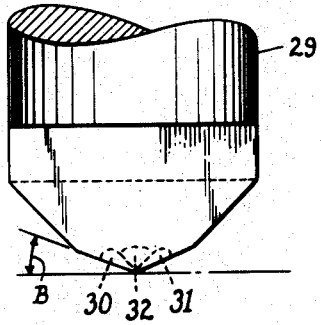
FIG. 14 is another side elevation of the same, viewed from a direction at right angles to the direction of viewing in FIG. 13.

A typical form of tool 29 for forming the pyramidal elements is shown in FIGS. 12, 13, and 14. This tool may be made of steel, provided with pyramidal surfaces 30, 31, and 32, meeting at an apex 33, the face 32 being smaller than the faces 30 and 31, so that the pyramid has a base in the form of an isosceles triangle, as shown in FIG. 8. The angle B (FIG. 14) may be, for example, from 11 to 14 degrees; the angle C (FIG. 13) may be from 28 to 34 degrees; the angle D may be 50 degrees; and the angle E may be 55 degrees.

In speaking of the bases of the conical or pyramidal elements, it is to be understood that reference is made to the theoretical bases of the cones or pyramids considered as geometrical figures. In most forms of the present invention, these bases do not actually exist as separate identifiable faces or areas, but exist theoretically or abstractly as parts of the geometrical figures.

For lack of a suitable generic word which includes both cones and pyramids, it is intended that the expression "cone-like" and "pyramid-like" as used in this application shall be interpreted to include cones and pyramids.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

Relating to a reflex finder focussing system according to FIG. 11 with a lens 8 having a focal length of 75 millimeters and a screen 9 of 60 millimeters square the angles $\delta$ (FIGS. 1 and 3) of the pyramidal indentations near the center of the screen are about $$\delta_1 = 80° \text{ and } \delta_2 = 80°$$

and at a distance of about 20 millimeters offset laterally from the optical axis passing through the center are $$\delta_1 = 100° \text{ and } \delta_2 = 60°$$

and at the corners of the screen are $$\delta_1 = 120° \text{ and } \delta_2 = 40°$$

These angles would of course have to vary somewhat in accordance with the index of refraction of the plastic material from which the screen is made and given in correspondence for example with an index of refraction of 1.5.

What is claimed is:

1. A focusing screen comprising a sheet of transparent material having one face thereof provided with a large number of relatively small pyramid-like formations the geometrical axes of which formations are inclined progressively from a central area of the screen outwardly toward the lateral edges thereof, to converge light beams received from one side of the screen toward a common position on the other side of the screen, the apices of all of said pyramid-like formations lying substantially in a common plane and being spaced from the respective next adjacent apices by distances from 0.02 to 0.04 millimeter, the apex region of each of said formations being substantially identical with the apex region of the other pyramid-like formations in shape but being oriented differently in such fashion that a corresponding side of each of said formations is faced toward an optical axis passing through the center of said screen.

2. A construction as defined in claim 1, in which said pyramid-like formations are of conical shape.

3. A construction as defined in claim 1, in which said pyramid-like formations are of pyramidal shape.

4. A construction as defined in claim 1, in which said pyramid-like formations are of concave shape indented into said transparent material.

5. A construction as defined in claim 1, in which said pyramid-like formations are of convex shape protruding from the body of said transparent material.

6. A focusing screen comprising a sheet of transparent material having one face thereof smooth and plane and the other face thereof provided with a large number of relatively small indentations of pyramidal form, each of said indentations having an apex spaced from the apices of respective surrounding indentations by a distance from 0.02 to 0.04 millimeter, the apices of all of said indentations lying in a common plane parallel to said smooth plane face of the screen, the geometrical axes of the respective pyramidal indentations from the center of said screen outwardly toward the marginal edges thereof being progressively inclined to an increasing extent as the distance from the center of said screen increases, in such manner as to converge light beams received from one side of the screen toward a common position on the other side of the screen, said indentations being in the form of faces of pyramids having triangular geometrical bases, so that each indentation has three light deflecting faces, one of said three faces being smaller than the other two and being faced toward the center of said screen.

7. A focusing screen for use in focusing a movable lens of a photographic camera by visual observation of an image projected onto said screen by such lens, said screen comprising a sheet of transparent material having one face thereof substantially smooth and plane and having the opposite face thereof formed with a great multiplicity of very minute pyramid-like formations each having an apex, the apices of substantially all of said formations lying substantially in a common plane constituting the focal plane of the image to be focused, the sides of said formations constituting refracting surfaces for refracting light from an image which is not focused accurately on the common plane of said apices in such manner as to cause such inaccurately focused image to appear blurred in contrast to the appearance of an image sharply focused on said common plane, each of said formations having a geometrical axis passing through its apex, the axes of the formations progressively farther from the center of said screen being tilted at progressively greater angles to an optical axis perpendicular to said common plane at the center thereof, so that light rays from portions of said screen progressively farther from the center thereof will be refracted progressively more toward said optical axis, to increase the apparent brilliance of marginal portions of said focusing screen and to tend to overcome the usual dimness of the marginal portions of a focusing screen as compared with the central portion thereof, without requiring a supplementary field lens.

8. A focusing screen as defined in claim 7, in which the pyramid-like formations are of pyramidal shape with one face smaller than the other faces and so oriented that the smaller face of each pyramid is faced toward said optical axis passing through the center of the screen.

References Cited in the file of this patent
UNITED STATES PATENTS

| | | |
|---|---|---|
| 1,572,236 | Frederick | Feb. 9, 1926 |
| 1,970,358 | Bull et al. | Aug. 14, 1934 |
| 2,161,842 | Allison | June 13, 1939 |
| 2,200,646 | Strong | May 14, 1940 |
| 2,279,555 | Brown et al. | Apr. 14, 1942 |
| 2,589,014 | McLeod | Mar. 11, 1952 |